3,390,214
PROCESS FOR THE MANUFACTURE OF COMPOSITE FOAMED PLASTIC ARTICLES
George Woods, Manchester, England, assignor to Imperial Chemical Industries Limited, London, England, a corporation of Great Britain
Filed June 17, 1964, Ser. No. 375,710
Claims priority, application Great Britain, June 17, 1963, 24,014/63
4 Claims. (Cl. 264—45)

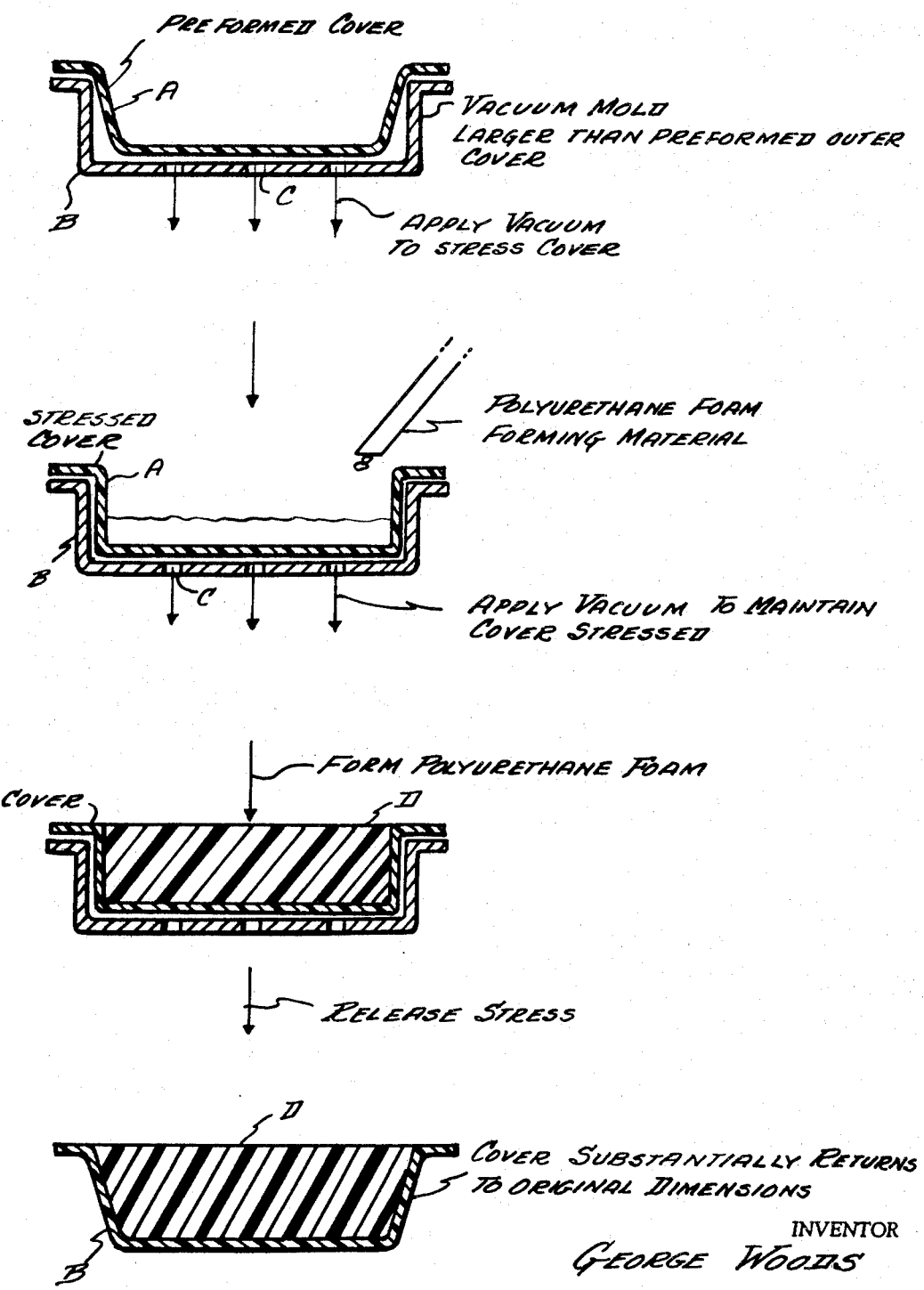

ABSTRACT OF THE DISCLOSURE

A process for manufacturing of composite articles having an outer cover and filled with polyurethane foam. In the process a pre-formed cavity in a covering material is filled with polyurethane foam-forming mixture and the mixture is allowed to foam and set to an elastic condition within the cavity. The filling, foaming and setting are carried out after the pre-formed cavity has been enlarged by applying stressing forces to the covering material. These forces are released after the foam has set.

---

This invention relates to the manufacture of composite articles suitable for use as upholstery materials.

It is already known to manufacture composite articles suitable for use as upholstery materials, for example cushions, by allowing a flexible polyurethane foam to form within a flexible material which is to act as an outer cover for the upholstery material. Such a procedure does not always, however, produce entirely satisfactory materials in that the cover is usually loose or has a wrinkled appearance.

It has now been found that this difficulty may be obviated or minimised by allowing the foam to form and cure within the cover whilst the latter is in a stressed condition and then removing the forces producing the stress.

Thus according to the present invention there is provided a process for the manufacture of composite articles, suitable for use as upholstery materials, which comprise a flexible outer cover and a flexible polyurethane foam filling, said process comprising allowing the foam to form and cure within the cover whilst the latter is in a stressed condition and then removing the forces producing the stress.

Suitable outer covers for use in the process of the present invention include flexible plastic sheet materials and coated textiles such as polyvinyl chloride leathercloths coated on stretchable fabrics. It is particularly convenient to use vacuum-formed cushion covers, for example vacuum-formed polyvinyl chloride sheet or sheet made from a copolymer of acrylonitrile butadiene and styrene.

The cover may be suitably stressed by the use of vacuum applied to a female mould in which the preformed cover is placed for filling with foam. The degree of stress may be controlled by the size difference between the vacuum-forming mould in which the cover is made and the vacuum-stressing mould in which the foam is formed. Preferably the stress applied should be such as to temporarily increase the volume of the cushion cover by about 5%.

The accompanying drawing illustrates but does not limit the steps of the invention, and shows cross-sections of a polyvinyl chloride cushion cover A in position in a vacuum-stressing mould B before vacuum is applied to the mould by means of the vents C. The drawing also shows the same cross-section whilst vacuum is being applied to the mould B and shows that the cushion cover A has been stressed so as to conform to the dimensions of the mould. The third cross-section shows a fully expanded polyurethane foam-forming reaction mixture D which cures to fill the cushion cover with flexible polyurethane foam. The mould is then disconnected from the source of vacuum and the cushion cover substantially returns to its original dimensions. If desired a mould lid made of wood or aluminium sheet or other suitable material may be employed. Such lids would normally be vented to allow escape of air from the mould as the mixture expands.

Vacuum is normally applied to the vents C from a vacuum box connected to a pump and vacuum gauge. The vacuum stressing mould B may be an integral portion of a vacuum box through which vacuum is applied to the vents C or alternatively B can be sealed into a vacuum box by means of a gasket and clamps. In the latter case the vacuum can be released after the foam has risen and set and the vacuum stressing mould B containing the foam then removed from the vacuum box and the foamed composite article and mould B placed in an oven to accelerate the cure of the foam. This enables the vacuum box to be used again immediately, for example if manufacture is taking place on a production line.

The flexible polyurethane foam element of the composite materials made according to the process of the present invention may be prepared according to any of the processes described or used in the prior art. Thus the foams may be made by reacting organic polyisocyanates in one or more stages with hydroxyl group-containing polymers such as polyesters, polyethers or polyesteramides with the addition as required of gas-generating agents such as water and low boiling-point organic liquids and other additives described in the prior art such as catalysts and surface active agents. The ingredients should be such as to result in a foamed product having the desired degree of flexibility and resiliency, the choice of these is well known in the art.

The composite articles made according to the process of the present invention are suitable for use as upholstery materials especially in the transport and furniture industries.

The invention is further illustrated but not limited by the following example in which all parts and percentages are by weight:

EXAMPLE

A polyvinyl cushion cover (A) is placed in position in the vacuum stressing mould B and a vacuum of 23 cm. water gauge applied to the mould B from a vacuum box through the vents C. Air pressure above then forces the cushion cover A into the mould B and the cushion cover assumes the stressed condition.

The following polyurethane foam forming components are then mixed vigorously and sufficient of this mixture to completely fill the cover on expansion is introduced into the stressed cushion cover in the mould.

| Foam-forming mixture: | Parts |
|---|---|
| Glycerol/propylene oxide condensate M.W. 3000 | 100 |
| Tolylene diisocyanate, 80/20 mixture of the 2,4- and 2,6-isomers | 44.6 |
| Triethylene diamine | 0.14 |
| Stannous octoate | 0.2 |
| An oxyalkylene siloxane block copolymer | 1.5 |
| N-methyl morpholine | 0.5 |
| Water | 3.5 |

Immediately after charging the foam-forming mixture a lid covered with sheet polyethylene for easy release was placed on the mould. The foam-forming mixture was allowed to react and filled the mould with a solid flexible foamed mass. The vacuum was then released and the foam finally cured for 1 hour at 40° C. before removing the complete composite cushion from the mould.

I claim:

1. Process for the manufacture of composite articles suitable for use as upholstery materials consisting of a flexible outer cover and a flexible polyurethane foam filling, the process comprising the steps of (1) applying stressing forces to a flexible covering material containing a pre-formed cavity so as temporarily to increase the size of the cavity, thereafter (2) introducing a polyurethane foam-forming mixture into the cavity and allowing a polyurethane foam to form and set to an elastic condition within the cavity while the flexible covering material is maintained in a stressed condition and subsequently (3) removing the stressing forces, the temporarily stretched covering material retaining sufficient elastic reconvery to contract to its original dimensions with shrinkage of said polyurethane foam.

2. Process for the manufacture of composite articles as claimed in claim 1 wherein the flexible covering material is comprised of a flexible plastic sheet material or a plastic coated textile material.

3. A process for the manufacture of composite articles as claimed in claim 1, wherein the flexible covering material is comprised of flexible plastic material in which a suitably-shaped cavity has already been produced by a vacuum-forming technique.

4. A process for the manufacture of composite articles as claimed in claim 1, wherein the flexible covering material is stressed by placing that portion of the covering material containing the pre-formed cavity into a female mold having an internal volume approximately 5% greater than the volume of the cavity and applying vacuum to the mold so as to draw the covering material elastically into contact with the internal surface thereof.

References Cited

UNITED STATES PATENTS

| | | | |
|---|---|---|---|
| 2,955,972 | 10/1960 | Wintermute et al. | 264—45 X |
| 3,204,016 | 8/1965 | Sanger et al. | 264—45 |

FOREIGN PATENTS

| | | |
|---|---|---|
| 653,600 | 12/1962 | Canada. |
| 656,199 | 1/1963 | Canada. |

JAMES A. SEIDLECK, *Primary Examiner.*

ALEXANDER H. BRODMERKEL, PHILIP E. ANDERSON, *Examiners.*